(12) United States Patent
Pierce et al.

(10) Patent No.: US 11,499,283 B2
(45) Date of Patent: Nov. 15, 2022

(54) WHEEL GUARD FOR COMPACTOR WHEEL

(71) Applicant: Caterpillar Inc., Peoria, IL (US)

(72) Inventors: Dan Pierce, Deadwood, SD (US); Jim Dale Angell, Naperville, IL (US); Thomas Marshall Congdon, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 323 days.

(21) Appl. No.: 16/847,042

(22) Filed: Apr. 13, 2020

(65) Prior Publication Data
US 2021/0317629 A1 Oct. 14, 2021

(51) Int. Cl.
*B60B 15/26* (2006.01)
*B62D 55/088* (2006.01)
*E02D 3/026* (2006.01)
*B60B 15/02* (2006.01)

(52) U.S. Cl.
CPC ............ *E02D 3/0265* (2013.01); *B60B 15/02* (2013.01); *B60B 15/026* (2013.01); *B62D 55/088* (2013.01)

(58) Field of Classification Search
CPC ....... E02D 3/026; E02D 3/0265; B60B 15/02; B60B 15/026; B60B 15/26; B60B 15/266; B62D 55/088; B60S 1/68
USPC ................ 301/43, 44.1, 44.3, 44.4; 305/100, 305/107–109, 110; 404/121, 124, 129
See application file for complete search history.

(56) References Cited

U.S. PATENT DOCUMENTS

| | | | |
|---|---|---|---|
| 6,991,401 | B1 | 1/2006 | Caron |
| 8,007,200 | B2 | 8/2011 | Brockway |
| 8,807,669 | B2 | 8/2014 | Mcphail et al. |
| 2007/0280783 | A1 | 12/2007 | Gibbins |
| 2014/0062166 | A1 | 3/2014 | Crystal et al. |
| 2020/0115872 | A1* | 4/2020 | Pierce ..................... B60B 19/00 |

FOREIGN PATENT DOCUMENTS

WO     WO2012125907     9/2012

* cited by examiner

*Primary Examiner* — Sunil Singh

(57) ABSTRACT

A wheel guard includes a guard member disposed on a compactor wheel. The guard member has a first side having a first portion and a second portion. The second portion is offset from the first portion such that to define a first stepped recess therein. The guard member has a second side disposed opposite to the first side. The first portion has a first cross-sectional thickness and the second portion has a second cross-sectional thickness such that the second cross-sectional thickness is lesser than the first cross-sectional thickness. The guard member has a first top surface defined by the first portion, and a second top surface defined by the second portion and partially by the first portion. The second top surface is offset from the first top surface such that to define a second stepped recess therein. The wheel guard includes a base plate and a wear pad coupled thereto.

20 Claims, 10 Drawing Sheets

US 11,499,283 B2

WHEEL GUARD FOR COMPACTOR WHEEL

TECHNICAL FIELD

The present disclosure generally relates to compactor wheels and, more particularly, relates to guards for preventing debris from accessing and winding around axles supporting such wheels.

BACKGROUND

With certain vehicles, it is important to prevent debris from accessing and winding around the axles of the vehicle. One example is land fill compactors (LFCs). Landfills include vast quantities of trash and refuse of varied shape, size, weight and texture. LFCs are used to move the refuse around the landfill for processing, or to evenly distribute the refuse across the landfill prior to being covered with soil. More specifically, as the acreage of a landfill is of a finite quantity, it is beneficial to evenly distribute the refuse to take maximum advantage of the available space. In addition, it is beneficial to break down the refuse into smaller pieces to both facilitate this space usage and lessen the time required for disintegration, biodegradation, dissolution, etc.

While effective, the terrain encountered at a landfill by an LFC is as a result very unpredictable and often sparse or inconsistent in nature. Moreover, as the land fill is being continually added to with new debris typically by dump truck or conveyor, the debris is often initially provided in piles. Over time this can create significant inclines and declines over which the LFC must traverse. To do so, a typical LFC includes four or more wheels having metal rims from which protrude a plurality of spaced and elongated cleats or tips. Such wheels are designed to not only dig deeply into the refuse and provide the traction necessary to navigate, but also chop or otherwise break down the refuse as they rotate.

A particular challenge faced by LFCs is the prevention or abatement of refuse being entrained around the axles of the wheels. This is particularly true of long thin refuse such as wire, cable, or the like that may wrap around the axle or get trapped between the side edge of a wheel and a portion of the wheel-well or chassis of the LFC. Such entrained material may lock the wheel in position potentially crippling operation of the machine, as well as decreasing efficiency and increasing fuel consumption.

In light of the foregoing, certain manufacturers have started to provide structures to limit the ability of such refuse reaching the axle. For example, striker bars can be placed fore and/or aft of the wheel to prevent large pieces of debris from being carried around by the wheel. In addition, a radially extending wall made up of multiple plates may be welded around the entire circumference of the rim at a laterally innermost position. However, the installation of such a wall necessarily adds significant weight to the LFC, and thus may decrease its fuel efficiency. In addition, such walls may require significant time and effort for installation to properly fit around the entire circumference of the wall.

An example is provided by U.S. Pat. No. 8,807,669 disclosing an apparatus and method for preventing debris from accessing and wrapping around the axles of a vehicle, such as a landfill compactor. A wheel guard may be mounted between adjacent pairs of a subset of tips provided circumferentially around a laterally inner edge of a wheel. Each wheel guard may be welded to a rim and to the adjacent pairs of tips. The wheel guards and adjacent tips form a continuous barrier around the circumference of the wheel to prevent debris from accessing and wrapping around the axles of the compactor. However, the wheel guard may wear out readily due to nature of surface on which the vehicle is traveling, requiring frequent replacement of such wheel guards. Thus, there is a need to provide improved wheel guard arrangement for such vehicles.

SUMMARY

In an aspect of the present disclosure, a wheel guard for use on a compactor wheel is provided. The wheel guard includes a guard member disposed on the compactor wheel. The guard member has a first end and a second end. The guard member has a first side having a first portion and a second portion. The second portion is offset from the first portion such that the first portion and the second portion define a first stepped recess therein. The guard member has a second side disposed opposite to the first side. The first portion has a first cross-sectional thickness and the second portion has a second cross-sectional thickness such that the second cross-sectional thickness is lesser than the first cross-sectional thickness. The guard member has a first top surface defined by the first portion, and a second top surface defined by the second portion and partially by the first portion. The second top surface is offset from the first top surface such that the first top surface and the second top surface define a second stepped recess therein. The wheel guard includes a base plate overlaid upon and coupled to the second stepped recess. The wheel guard includes a wear pad coupled to the base plate.

In another aspect of the present disclosure, a compactor wheel is provided. The compactor wheel includes a rim having a circumferential surface, a first edge, and a second edge. The compactor wheel includes a plurality of cleats radially extending from the circumferential surface. The compactor wheel includes a plurality of wheel guards secured between circumferentially adjacent cleats provided proximate to the first edge of the rim. The plurality of wheel guards and adjacent cleats form a barrier around the circumference of the rim. Each of the wheel guard includes a guard member disposed on the compactor wheel. The guard member has a first end and a second end. The guard member has a first side having a first portion and a second portion. The second portion is offset from the first portion such that the first portion and the second portion define a first stepped recess therein. The guard member has a second side disposed opposite to the first side. The first portion has a first cross-sectional thickness and the second portion has a second cross-sectional thickness such that the second cross-sectional thickness is lesser than the first cross-sectional thickness. The first portion has a first top surface and the second portion has a second top surface. The second top surface is offset from the first top surface such that the first top surface and the second top surface define a second stepped recess therein. Each of the wheel guard includes a base plate overlaid upon and coupled to the second stepped recess. Each of the wheel guard includes a wear pad coupled to the base plate.

In yet another aspect of the present disclosure, a compactor is provided. The compactor includes a frame. The compactor includes a power source disposed on the frame. The compactor includes an operator cabin disposed on the frame. The compactor includes a plurality of compactor wheels adapted to propel the compactor on a ground surface. Each of the compactor wheel include a rim having a circumferential surface, a first edge, and a second edge. The compactor wheel includes a plurality of cleats radially extending from the circumferential surface. The compactor wheel includes a plurality of wheel guards secured between circumferentially adjacent cleats provided proximate to the first edge of the rim. The plurality of wheel guards and adjacent cleats form a barrier around the circumference of the rim. Each of the wheel guard includes a guard member disposed on the compactor wheel. The guard member has a first end and a second end. The guard member has a first side having a first portion and a second portion. The second portion is offset from the first portion such that the first portion and the second portion define a first stepped recess therein. The guard member has a second side disposed opposite to the first side. The first portion has a first cross-sectional thickness and the second portion has a second cross-sectional thickness such that the second cross-sectional thickness is lesser than the first cross-sectional thickness. The first portion has a first top surface and the second portion has a second top surface. The second top surface is offset from the first top surface such that the first top surface and the second top surface define a second stepped recess therein. Each of the wheel guard includes a base plate overlaid upon and coupled to the second stepped recess. Each of the wheel guard includes a wear pad coupled to the base plate.

Other features and aspects of this disclosure will be apparent from the following description and the accompanying drawings.

DETAILED DESCRIPTION

Figure 1:
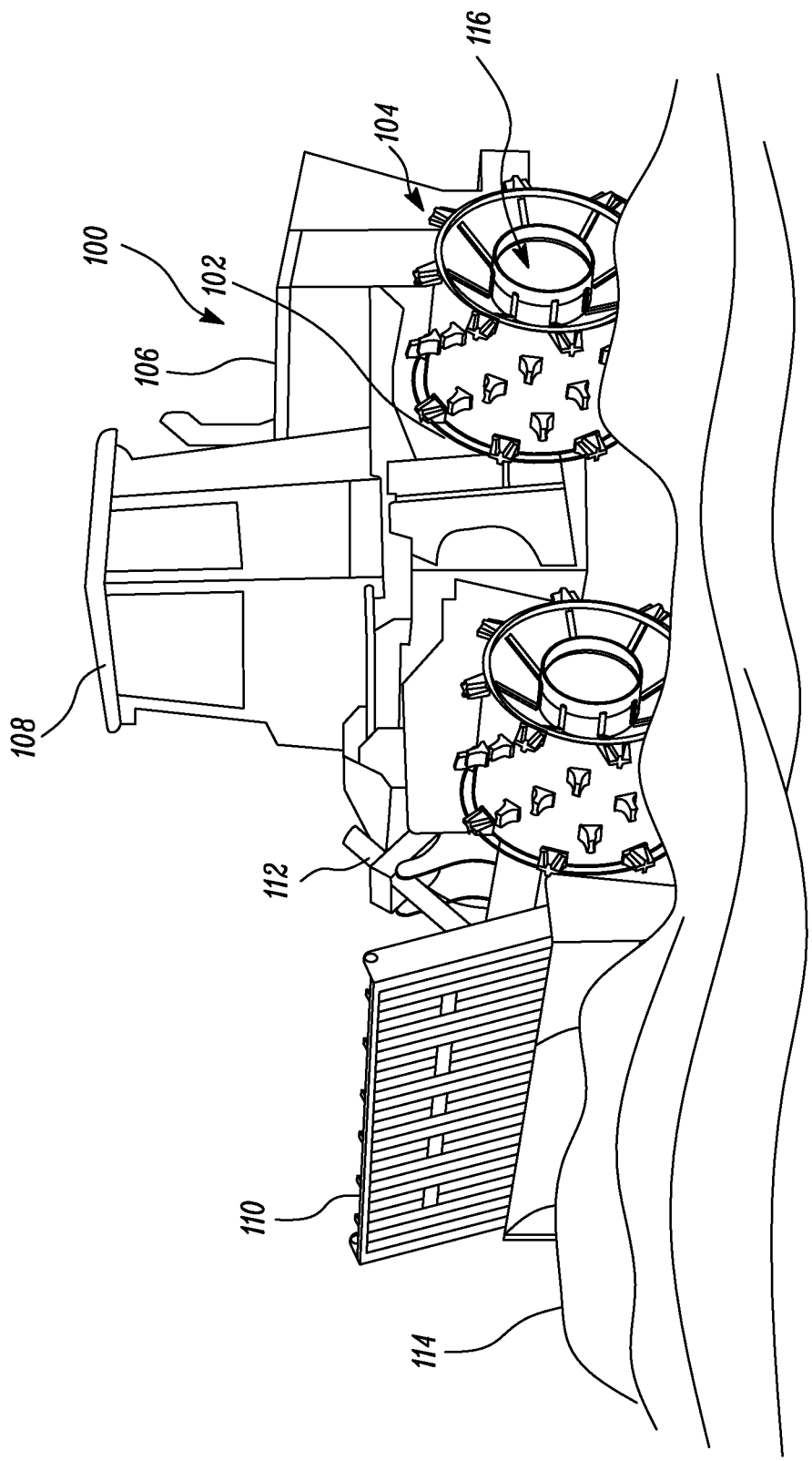
FIG. 1 shows an exemplary machine in an operational configuration, according to an aspect of the present disclosure.

Wherever possible, the same reference numbers will be used throughout the drawings to refer to same or like parts. Referring to FIG. 1, a compactor constructed in accordance with the teachings of the disclosure is generally referred to by reference numeral 100. As indicated above, the compactor 100 may be a landfill compactor (LFC) as shown in FIG. 1, but it is to be understood the teachings of the present disclosure can be used in conjunction with other types of compactors as well. The compactor 100 includes a frame 102 supported by compactor wheels 104. The frame 102 supports an engine 106 and an operator cabin 108. Various implements such as a blade 110 is mounted on the frame 102 and is movable by hydraulic cylinders 112 or the like to raise, lower, tilt and turn, and thus manipulate and move debris 114. Each of the compactor wheels 104 is mounted on an axle 116.

Each of the compactor wheel 104 include the rim 118 having a circumferential surface, the first edge 122, and the second edge 124. The compactor wheel 104 includes the plurality of cleats 120 radially extending from the circumferential surface. The compactor wheel 104 includes the plurality of wheel guards 128 secured circumferentially between the adjacent cleats 120 provided proximate to the first edge 122 of the rim 118. The plurality of wheel guards 128 and adjacent cleats 120 form a barrier around the circumference of the rim 118

Figure 2:
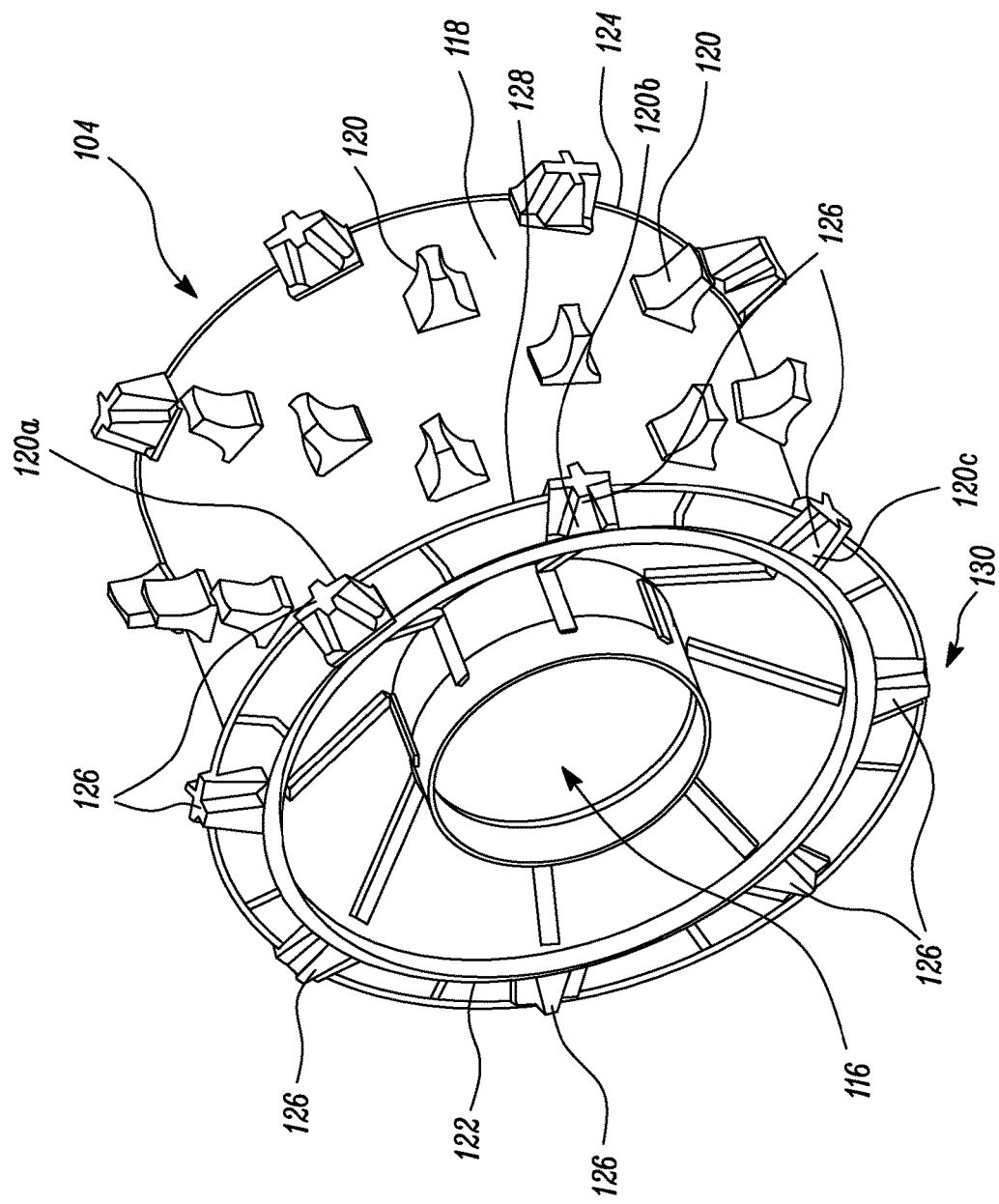
FIG. 2 shows a compactor wheel of the machine, according to an aspect of the present disclosure.

Referring to FIG. 2, each compactor wheel 104 includes an annularly shaped rim 118 from which a plurality of cleats or cleats 120 extend radially. As shown, the cleats 120 may be provided in a helical pattern laterally across the rim 118 from the first edge 122 to the second edge 124 such as in FIG. 2. The cleats 120 may also be provided in an offset pattern or in any number of different patterns. As it pertains to the present disclosure, it is important to note that with each such pattern, a subset 126 of cleats 120 is provided proximate the first edge 122 of the rim 118.

Between each pair of adjacent cleats 120 in the laterally innermost subset 126 is provided a wheel guard 128. For example, in FIG. 2, one pair of adjacent cleats is labeled 120a and 120b, and another pair of adjacent cleats is labeled 120b and 120c. Although all cleats 120 are not labeled in FIG. 2, it is to be understood that an adjacent pair of cleats is any circumferentially adjacent pair of the subset 126. By so mounting the wheel guards 128 between adjacent cleats 120, a continuous barrier 130 is provided circumferentially around the rim 118. In so doing, the ability of debris 114 to access and wrap around axles 116 is limited.

The compactor wheel 104 constructed in accordance with the teachings of this disclosure is mounted to the compactor 100 such that the barrier 130 is provided laterally inward and adjacent the frame 102. Accordingly, any wire or cable or the like caught up in the cleats 120 that is pushed so as to laterally slide across the rim 118, will eventually contact the barrier 130 and be prevented from sliding down into a gap provided between the rim 118 and the frame 102. Access to and winding around the axles 116 is therefore largely eliminated.

Figure 3:
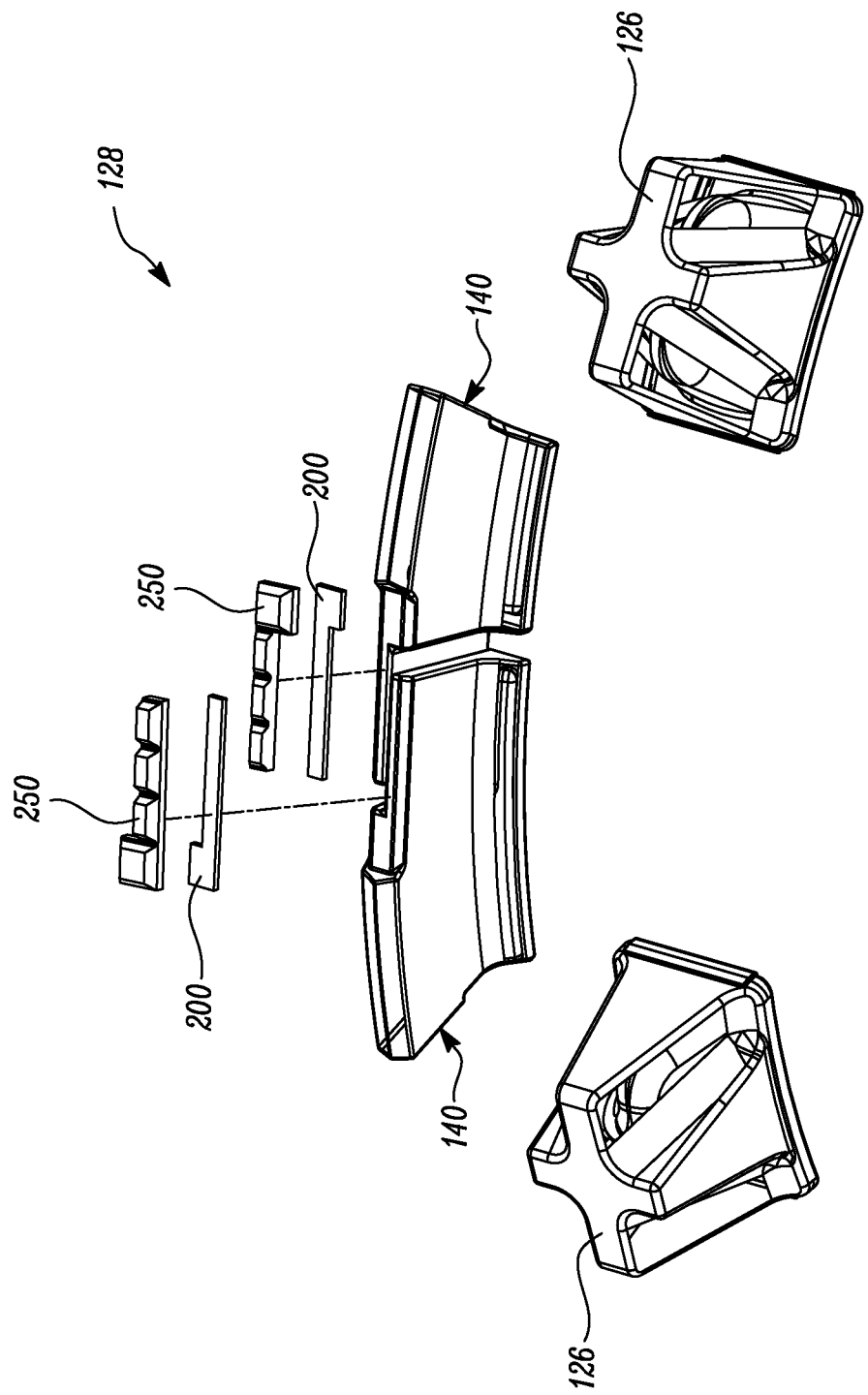
FIG. 3 shows an exploded view of a wheel guard disposed between two cleats on the compactor wheel.

FIG. 3 shows an exploded view of a wheel guard 128 provided between two subset of adjacent cleats 126. The wheel guard 128 includes two guard members 140 coupled to each other. The guard members 140 are provided on the compactor wheel 104 of the machine 100 (alternatively, the compactor 100). Each of the wheel guard 128 further includes a base plate 200 overlaid upon the guard member 140. The wheel guard further includes a wear pad 250 coupled to the base plate 200. Two guard members 140 couple with each other in a complementary manner. The wheel guard 140 may be coupled to another wheel guard 140 by merely rotating the wheel guard by 180 degrees and fitting together.

Figure 4:
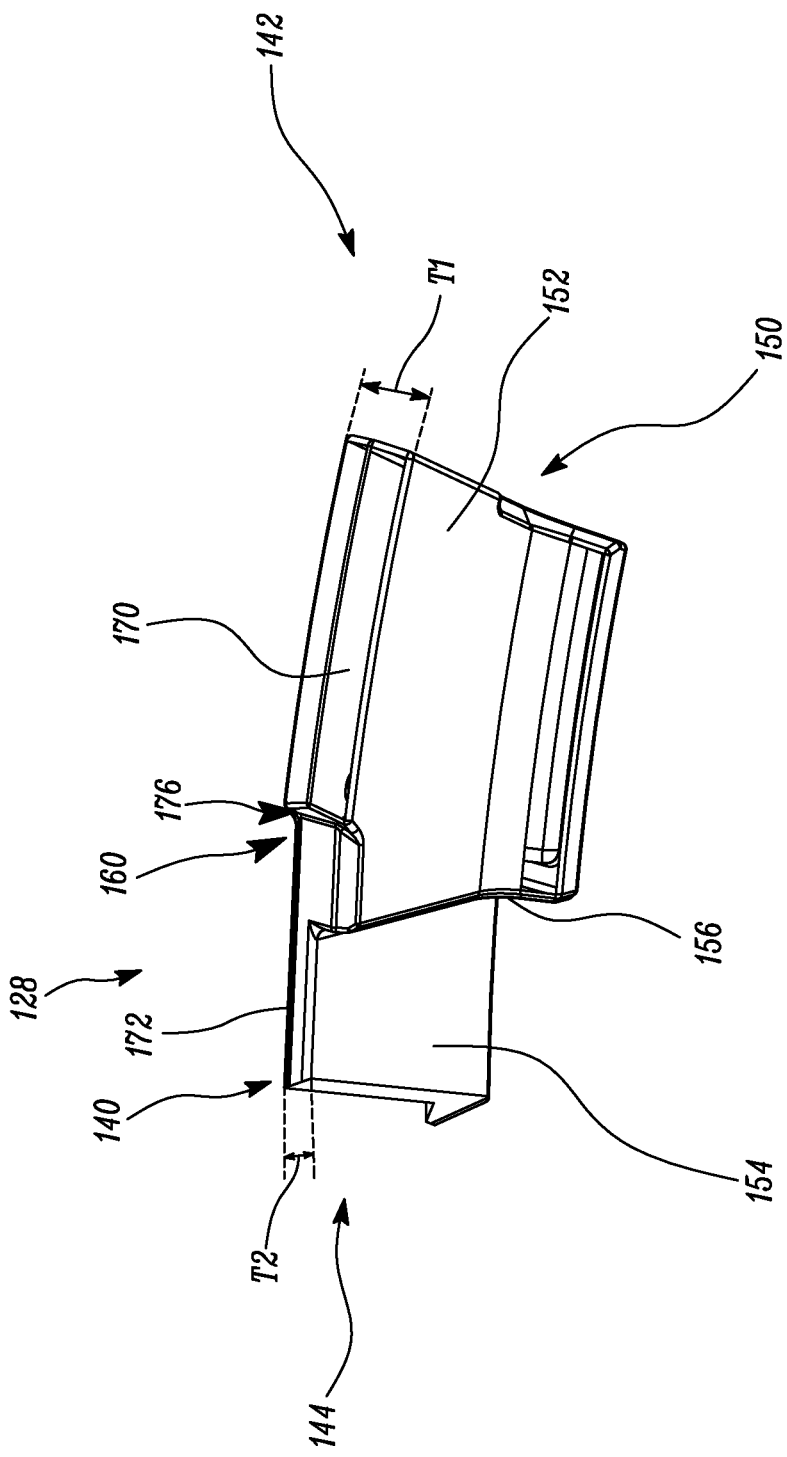
FIG. 4 shows a guard member disposed on the compactor wheel of the machine, according to an aspect of the present disclosure.

FIG. 4 shows further structural features of the guard member 140. The guard member 140 has a first end 142 and a second end 144. The guard member 140 has a first side 150 having a first portion 152 and a second portion 154. The second portion 154 is offset from the first portion 152 such that the first portion 152 and the second portion 154 define a first stepped recess 156 therein.

The guard member 140 has a second side 160 disposed opposite to the first side 150. The first portion 152 has a first cross-sectional thickness T1 and the second portion 154 has a second cross-sectional thickness T2 such that the second cross-sectional thickness T2 is lesser than the first cross-sectional thickness T1. The present disclosure may be readily implemented with any other relation (or even similar) values of the first cross-sectional thickness T1 and the second cross-sectional thickness T2, without limiting the present disclosure in any manner. The first portion 152 has a first top surface 170 and the second portion 154 has a second top surface 172. The second top surface 172 is offset from the first top surface 170 such that the first top surface 170 and the second top surface 172 define a second stepped recess 176 therein. Each of the wheel guard 128 includes the base plate 200 (shown in FIG. 3) overlaid upon and coupled to the second stepped recess 176. In some embodiments, the base plate 200 has a geometrical profile complementary to a profile of the second top surface 172 of the second portion 154 of the guard member 140. Each of the wheel guard 128 includes the wear pad 250 (shown in FIG. 3) coupled to the base plate 200.

Figure 5:
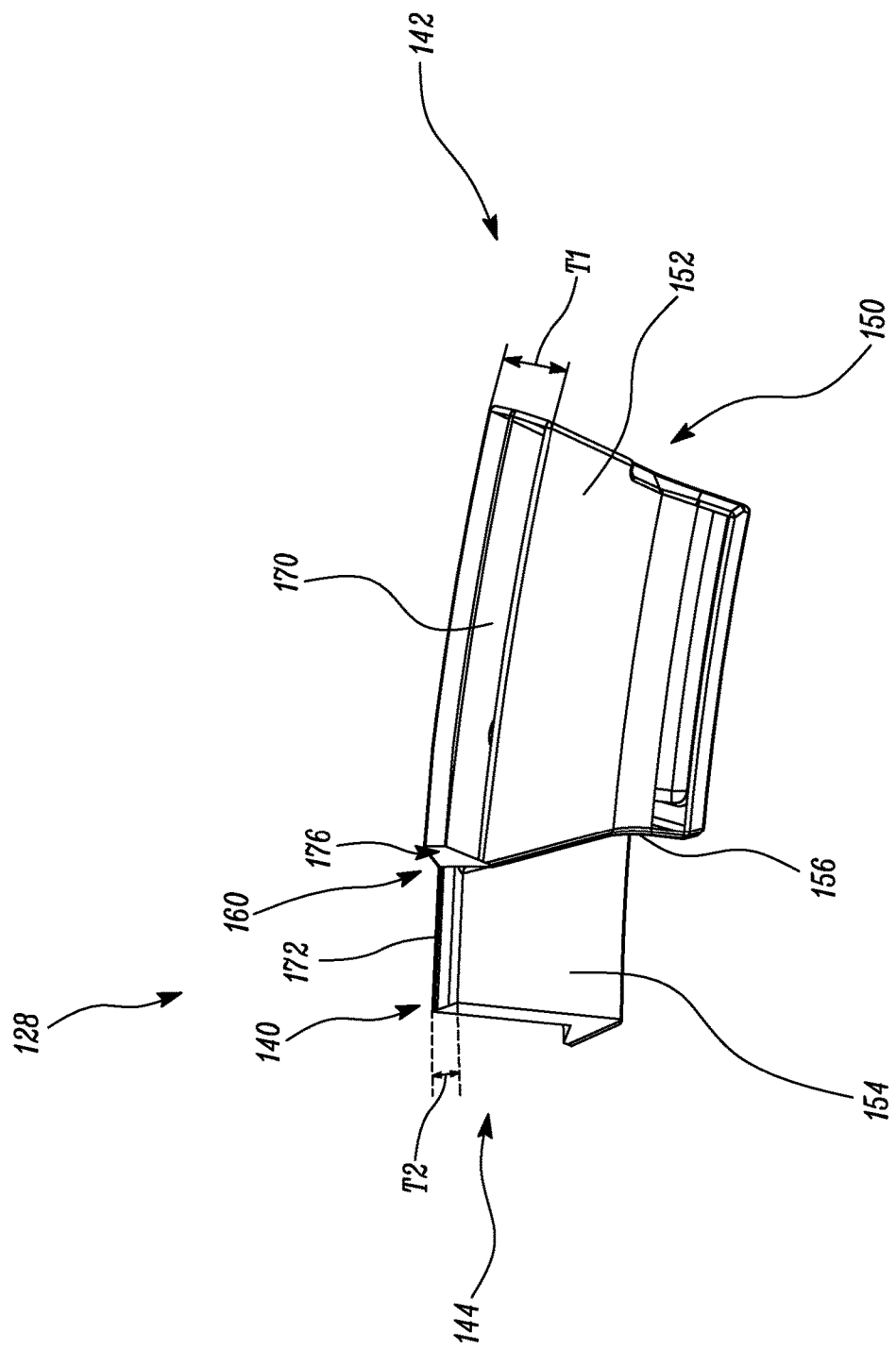
FIG. 5 shows another guard member disposed on the compactor wheel of the machine, according to an aspect of the present disclosure.

FIG. 5 shows another guard member 140 which is disposed on the compactor wheel 104 of the machine 100, according to an aspect of the present disclosure. The illustrated guard member 140 has the first top surface 170 extended till the first stepped recess 156. This design of the first top surface 170 may be in accordance with different factors such as shape, size, dimensions of base plate(s) 200, the wear pad(s) 250 or any other factor associated with the wheel guard 128.

Figure 6:
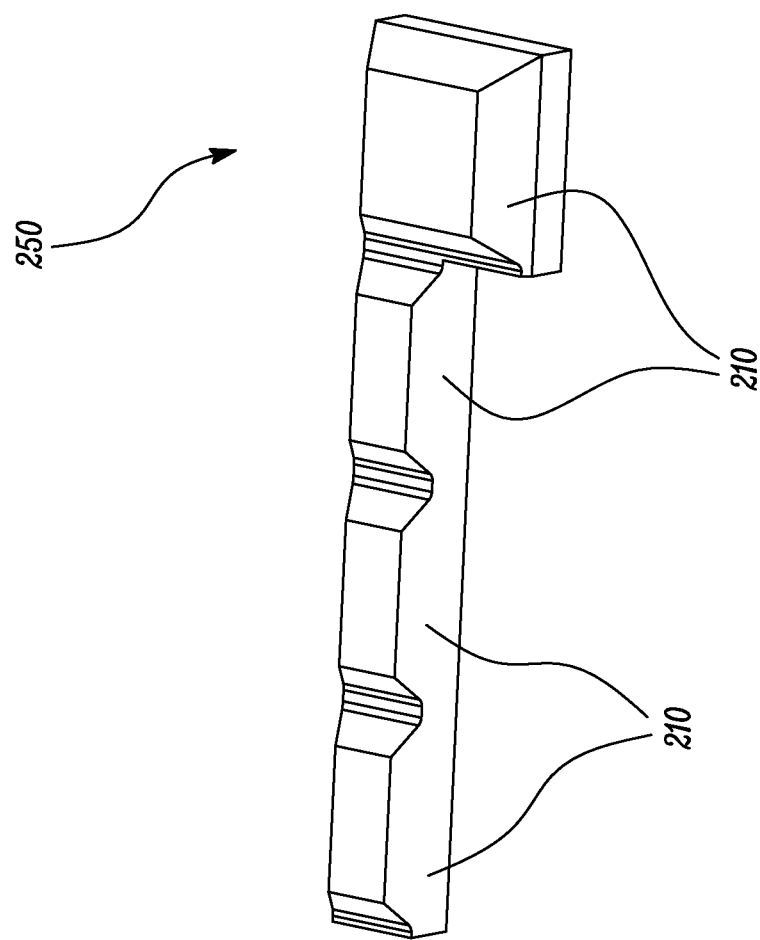
FIG. 6 shows a wear pad, according to an aspect of the present disclosure.

FIG. 6 shows the wear pad 250 associated with the guard member 140, according to an aspect of the present disclosure. The illustrated wear pad 250 has an L-shaped construction. The wear pad 250 may include one or more wear pad units 210 to make the wear pad 250 modular such that the wear pad 250 may be designed, assembled, or modified in accordance with the application needs.

Figure 7:
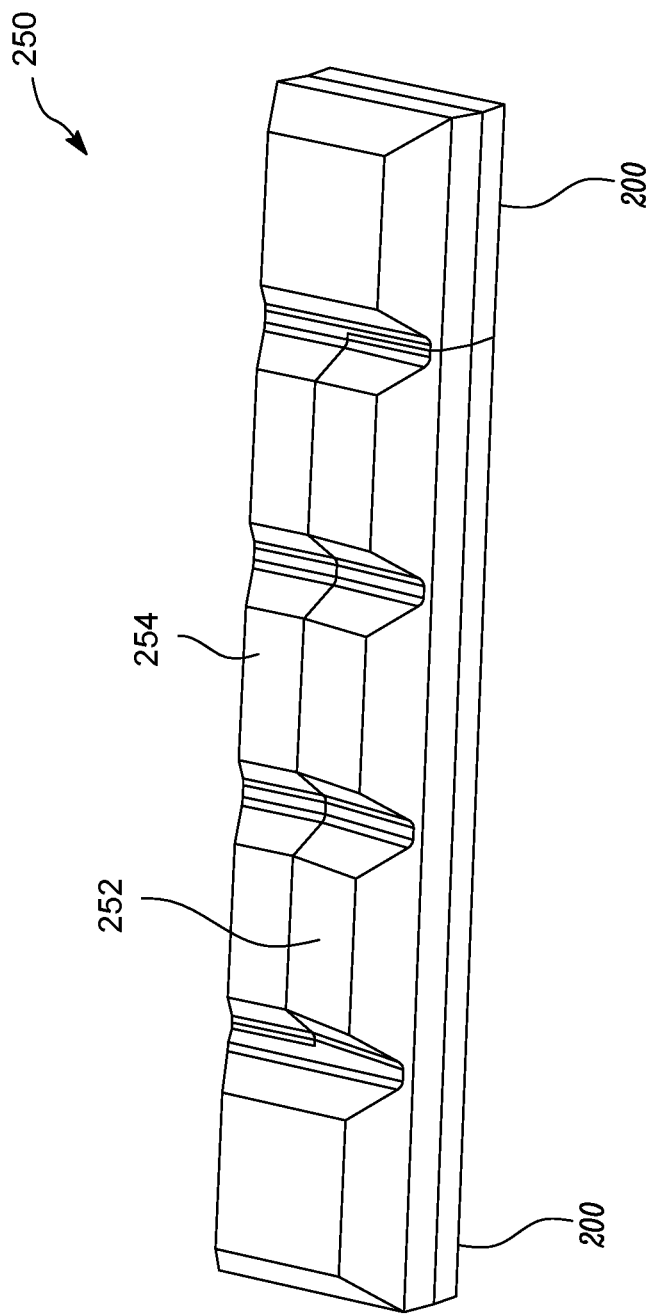
FIG. 7 shows another wear pad which couples with the base plate associated with the guard member, according to an aspect of the present disclosure.

FIG. 7 shows another embodiment of the wear pad 250. The wear pad 250 has a first wear pad portion 252 and a second wear pad portion 254. The first wear pad portion 252 and the second wear pad portion 254 are illustrated to depict a complementary configuration relative to each other when coupled together upon the respective base plates 200. The wear pad 250 has an integral construction and is constructed as a single piece. A user may also purchase such a wear pad 250 separately as an aftermarket part once the wear pad 250 gets worn out.

Figure 8:
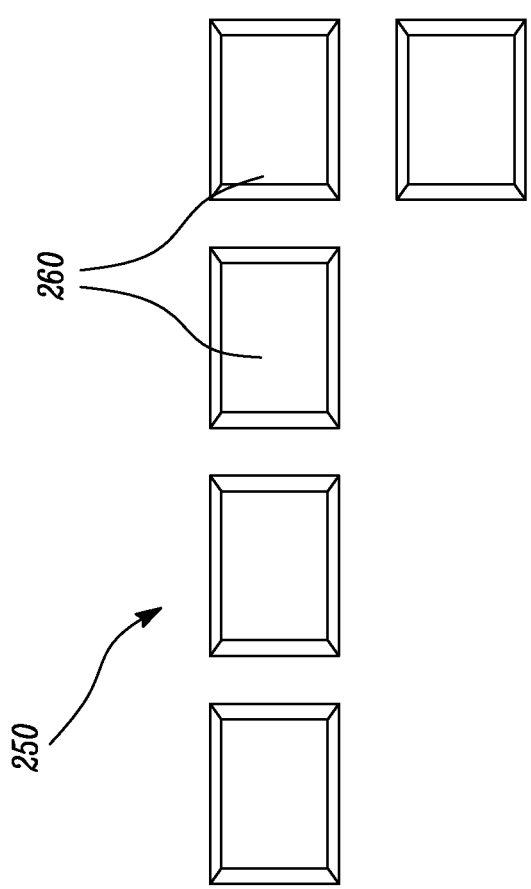
FIG. 8 shows a modular arrangement with two sets of the wear pads, according to an aspect of the present disclosure.

As illustrated in FIG. 8, the wear pad 250 includes a plurality of wear pad pieces 260. The present disclosure illustrates the wear pad pieces 260 as having a rectangular shape, however other geometrical shapes such as triangular, square and the like have been contemplated and well within the scope of the present disclosure. Each of the plurality of wear pad pieces 260 is coupled to the base plate 200 through welding. The wear pad 250 may be coupled to the base plate 200 by other means such as by fastener, soldering, brazing, or any other fastening technique as used or known in the art.

In some embodiments, a hardness of the wear pad 250 exceeds a hardness of the base plate 200 and the guard member 140. The wear pad 250 may play the role of a sacrificial element and may require substantial hardness in accordance with desired operating conditions. In an embodiment, the hardness of the wear pad may be in a range of Rockwell C 56-64. The wear pad 250 may face regular wear and tear due to cyclic and/or continuous contact with ground or other contacting surface which may have a bearing on service life of the wear pad 250.

Figure 9:
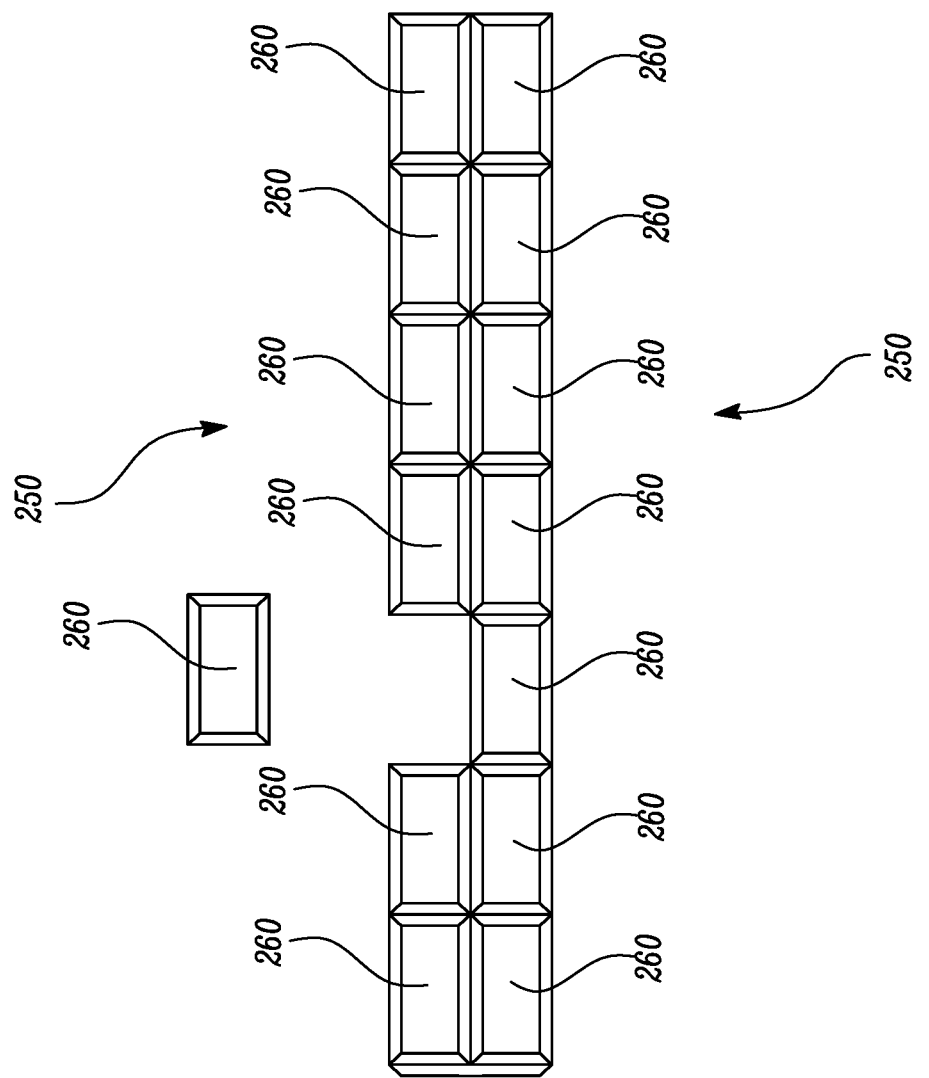
FIG. 9 shows another modular arrangement with two sets of the wear pads, according to an aspect of the present disclosure.

FIG. 9 shows another modular arrangement with two sets of the wear pads 250, according to an aspect of the present disclosure. The illustrated embodiment of the wear pads 250 may make them applicable for different values of the second cross-sectional thickness T2, among other design and structural features of the guard member 140.

In some embodiments, the wear pad 250 has a modular construction, as illustrated in FIG. 9. In some embodiments, the wear pad 250 has a geometrical profile complementary to a profile of the second top surface 172 of the second portion 154 of the guard member 140.

Figure 10:
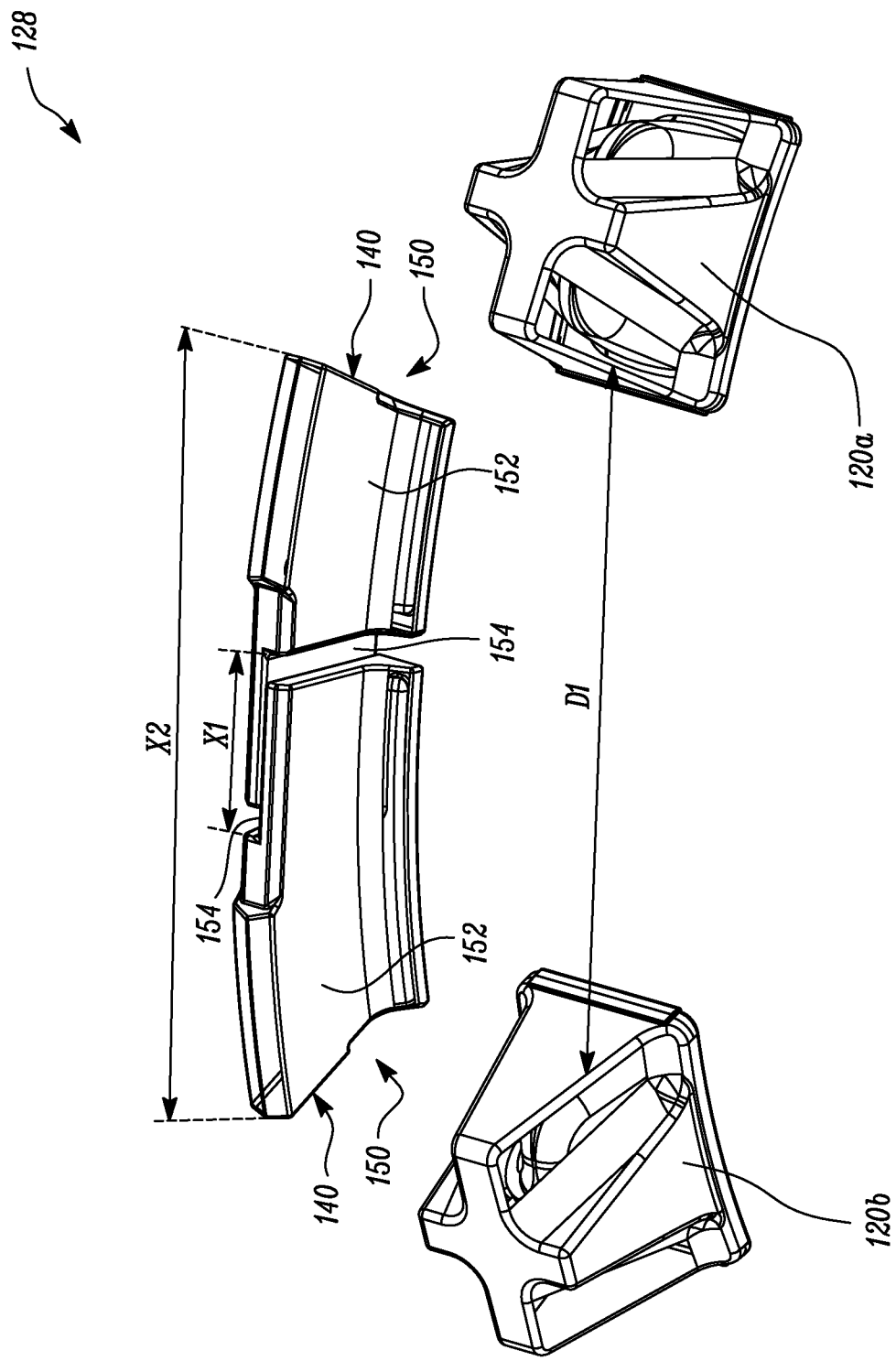
FIG. 10 shows two guard members in relation to two cleats of the compactor wheel, according to an aspect of the present disclosure.

FIG. 10 shows two guard members 140 in relation to the two cleats 120a, 120b of the compactor wheel 104 (shown in FIGS. 1&2). As illustrated, the second portion 154 of the first side 150 is adapted to mate with a second portion 154 of a first side 150 of another wheel guard 128. The guard members 140 may be structured and arranged on the compactor wheel 104 such that a distance X1 between the first stepped recesses 156 of the adjacent guard members 140 may be varied up to an end distance X2 of the adjacent guard members 140. Further, the distance X2 between the adjacent guard members 140 may be varied to a length equal to a gap D1 between the adjacent cleats 120a and 120b. It should be contemplated that the distance D1 may vary based on a size on the compactor wheel 104. Two compactor wheels 104 of different sizes may have different values for distance D1 compared to each other. This will allow desired assembly and disassembly of the adjacent guard members 140, and also provide universality of the applicability of the guard members 140 and/or the wheel guard 128, irrespective of the size, and other features of the compactor wheel 104.

INDUSTRIAL APPLICABILITY

The present disclosure advantageously provides improved assembly or installation for the wheel guard 128. The wheel guard 128 includes the guard member 140, base plate 200, and the wear pad 250. The wheel guard 128 may be provided with these three components welded together as a single unit, enabling installation of the wheel guard 128 through a single welding operation on the compactor wheel 104. This saves a lot of assembly time as there is no requirement for relatively locating these parts with each other before welding at multiple locations.

Further, such as arrangement also offers easy replacement of any of the guard member 140, the base plate 200, and the wear pad 250. Based on wearing out of any or all of these parts, appropriate replacements may be made as the wheel guard is available as a single unit, and available as individual parts as the guard member 140, the base plate 200, and the wear pad 250.

The present disclosure provides modularity to the improved design of the wheel guard 128. The wear pad 250 may be easily replaced upon being worn out and there is no need to replace the wheel guard 128 as a whole. Further, modularity in design of the wear pads 250 allows individual pieces of the wear pads 250 being replaced. Such design allows for appropriate replacement of worn out parts saving costs in terms of material, and ease of replacement.

From the foregoing, it can be seen that the technology disclosed herein has industrial applicability in a variety of settings such as, but not limited to, use on landfill compactor wheels to prevent or substantially reduce debris from accessing and winding around the axles of the compactor 100.

Moreover, it does so with much less complexity than prior art designs, with less welding required, greater stability, greater traction, and reduced manufacturing and maintenance costs.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A wheel guard for use on a compactor wheel, the wheel guard comprising:
   a guard member disposed on the compactor wheel, the guard member having:
   a first end and a second end;
   a first side having a first portion and a second portion, wherein the second portion is offset from the first portion such that the first portion and the second portion define a first stepped recess therein;
   a second side disposed opposite to the first side;
   the first portion having a first cross-sectional thickness and the second portion having a second cross-sectional thickness such that the second cross-sectional thickness is lesser than the first cross-sectional thickness;
   a first top surface defined by the first portion; and
   a second top surface defined by the second portion and partially by the first portion, wherein the second top surface is offset from the first top surface such that the first top surface and the second top surface define a second stepped recess therein;
   a base plate overlaid upon and coupled to the second stepped recess; and
   a wear pad coupled to the base plate.

2. The wheel guard of claim 1, wherein the wear pad has an integral construction.

3. The wheel guard of claim 1, wherein the wear pad has a modular construction.

4. The wheel guard of claim 3, wherein the wear pad includes a plurality of wear pad pieces.

5. The wheel guard of claim 4, wherein each wear pad piece of the plurality of wear pad pieces is coupled to the base plate through one or more of welding, a fastener, soldering, or brazing.

6. The wheel guard of claim 1, wherein a hardness of the wear pad exceeds a hardness of the base plate and the guard member.

7. The wheel guard of claim 1, wherein the second portion of the first side is adapted to mate with a second portion of a first side of another wheel guard.

8. The wheel guard of claim 1, wherein the base plate has a geometrical profile complementary to a profile of the second top surface of the second portion of the guard member.

9. The wheel guard of claim 1, wherein the wear pad has a geometrical profile complementary to a profile of the second top surface of the second portion of the guard member.

10. A compactor wheel comprising:
    a rim having a circumferential surface, a first edge, and a second edge;
    a plurality of cleats radially extending from the circumferential surface; and
    a plurality of wheel guards secured between circumferentially adjacent cleats of the plurality of cleats provided proximate to the first edge of the rim, the plurality of wheel guards and the circumferentially adjacent cleats forming a barrier around the circumference of the rim, wherein each wheel guard of the plurality of wheel guards includes:
    a guard member disposed on the compactor wheel, the guard member having:
    a first end and a second end;
    a first side having a first portion and a second portion, wherein the second portion is offset from the first portion such that the first portion and the second portion define a first stepped recess therein;
    a second side disposed opposite to the first side;
    the first portion having a first cross-sectional thickness and the second portion having a second cross-sectional thickness such that the second cross-sectional thickness is lesser than the first cross-sectional thickness; and
    the first portion having a first top surface and the second portion having a second top surface, wherein the second top surface is offset from the first top surface such that the first top surface and the second top surface define a second stepped recess therein;
    a base plate overlaid upon and coupled to the second stepped recess; and
    a wear pad coupled to the base plate.

11. The compactor wheel of claim 10, wherein the wear pad has an integral construction.

12. The compactor wheel of claim 10, wherein the wear pad has a modular construction.

13. The compactor wheel of claim 12, wherein the wear pad includes a plurality of wear pad pieces.

14. The compactor wheel of claim 13, wherein each wear pad piece of the plurality of wear pad pieces is coupled to the base plate through one or more of welding, a fastener, soldering, or brazing.

15. The compactor wheel of claim 10, wherein a hardness of the wear pad exceeds a hardness of the base plate and the guard member.

16. The compactor wheel of claim 10, wherein the second portion of the first side is adapted to mate with a second portion of a first side of another wheel guard.

17. The compactor wheel of claim 10, wherein the base plate has a geometrical profile complementary to a profile of the second top surface of the second portion of the guard member.

18. The compactor wheel of claim 10, wherein the wear pad has a geometrical profile complementary to a profile of the second top surface of the second portion of the guard member.

19. A compactor comprising:
    a frame;
    a power source disposed on the frame;
    an operator cabin disposed on the frame;
    a plurality of compactor wheels adapted to propel the compactor on a ground surface, each compactor wheel of the plurality of compactor wheels including:
    a rim having a circumferential surface, a first edge, and a second edge;
    a plurality of cleats radially extending from the circumferential surface;
    a plurality of wheel guards secured between circumferentially adjacent cleats of the plurality of cleats provided proximate the first edge of the rim, the plurality of wheel guards and the circumferentially adjacent cleats forming a barrier around the circumference of the rim, wherein each wheel guard of the plurality of wheel guards includes:
a guard member disposed on the compactor wheel, the guard member having:
  a first end and a second end;
  a first side having a first portion and a second portion, wherein the second portion is offset from the first portion such that the first portion and the second portion define a first stepped recess therein;
  a second side disposed opposite to the first side;
  the first portion having a first cross-sectional thickness and the second portion having a second cross-sectional thickness such that the second cross-sectional thickness is lesser than the first cross-sectional thickness; and
  the first portion having a first top surface and the second portion having a second top surface, wherein the second top surface is offset from the first top surface such that the first top surface and the second top surface define a second stepped recess therein;
a base plate overlaid upon and coupled to the second stepped recess; and
a wear pad coupled to the base plate.

20. The compactor of claim 19, wherein the wear pad has a modular construction.

* * * * *